(12) United States Patent
Vernaleken et al.

(10) Patent No.: US 9,989,378 B2
(45) Date of Patent: Jun. 5, 2018

(54) DISPLAY OF AIRCRAFT ALTITUDE

(71) Applicant: Airbus Defence and Space GmbH, Ottobrunn (DE)

(72) Inventors: Christoph Vernaleken, Eiterfeld (DE); Marco Opitz, Rohrbach (DE); Harald Neujahr, Markt Schwaben (DE); Eugenio Ferreira, Paris (FR); Lutz Broszio, Ingolstadt (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 0 days. days.

(21) Appl. No.: 14/761,865

(22) PCT Filed: Jan. 15, 2014

(86) PCT No.: PCT/EP2014/000079
§ 371 (c)(1),
(2) Date: Jul. 17, 2015

(87) PCT Pub. No.: WO2014/111251
PCT Pub. Date: Jul. 24, 2014

(65) Prior Publication Data
US 2015/0362332 A1    Dec. 17, 2015

(30) Foreign Application Priority Data
Jan. 18, 2013 (EP) ..................... 13290014

(51) Int. Cl.
*G05D 1/00* (2006.01)
*G05D 1/08* (2006.01)
(Continued)

(52) U.S. Cl.
CPC ........... *G01C 23/005* (2013.01); *B64D 45/00* (2013.01); *G01C 21/00* (2013.01); *G01C 23/00* (2013.01)

(58) Field of Classification Search
CPC .................. G01C 21/00; G01C 23/00
(Continued)

(56) References Cited

U.S. PATENT DOCUMENTS

| | | | | |
|---|---|---|---|---|
| 5,181,028 A | * | 1/1993 | Sharpe | G01C 23/00 340/974 |
| 5,212,480 A | * | 5/1993 | Ferro | G09B 9/46 33/330 |

(Continued)

FOREIGN PATENT DOCUMENTS

| | | |
|---|---|---|
| EP | 0 383 083 A1 | 8/1990 |
| EP | 2 466 264 A1 | 6/2012 |

OTHER PUBLICATIONS

International Search Report (PCT/ISA/210 and PCT/ISA/220) dated Jul. 9, 2014 (Four (4) pages).
(Continued)

*Primary Examiner* — Mahmoud S Ismail
(74) *Attorney, Agent, or Firm* — Crowell & Moring LLP

(57) ABSTRACT

A method for displaying an attitude of an aircraft includes receiving a roll angle, a pitch angle and a yaw angle of the aircraft, generating a display image indicating the roll angle, the pitch angle and the yaw angle, and displaying the display image on a display device. The display image includes a spherical shell with a track angle scale projected onto the spherical shell along a latitude line of the spherical shell and with a pitch angle scale projected onto the spherical shell along a longitude line of the spherical shell. Furthermore, the display image includes a graphical aircraft attitude indicator inside the spherical shell rotated with respect to the spherical shell such that the graphical aircraft attitude indicator indicates the roll angle, the pitch angle and the yaw angle of the aircraft with respect to the spherical shell.

11 Claims, 4 Drawing Sheets

(51) Int. Cl.

| | |
|---|---|
| *G05D 3/00* | (2006.01) |
| *G06F 7/00* | (2006.01) |
| *G06F 17/00* | (2006.01) |
| *G01C 21/00* | (2006.01) |
| *G01C 23/00* | (2006.01) |
| *B64D 45/00* | (2006.01) |
| *G08B 21/00* | (2006.01) |

(58) Field of Classification Search
USPC .............................. 340/946, 975, 974; 701/4
See application file for complete search history.

(56) References Cited

U.S. PATENT DOCUMENTS

| | | | |
|---|---|---|---|
| 6,489,898 B1* | 12/2002 | Nicholls | G01C 23/00 340/974 |
| 2011/0171612 A1* | 7/2011 | Gelinske | G09B 9/08 434/35 |
| 2012/0154178 A1* | 6/2012 | Schmidt | G01C 23/00 340/946 |

OTHER PUBLICATIONS

Written Opinion (PCT/ISA/237) dated Jul. 9, 2014 (Six (6) pages).
European Search Report dated Jun. 28, 2013 (Six (6) pages).

* cited by examiner

DISPLAY OF AIRCRAFT ALTITUDE

CROSS REFERENCE TO RELATED APPLICATIONS

This application claims priority from PCT International Application No. PCT/EP2014/000079, filed Jan. 15, 2014, which claims priority under 35 U.S.C. § 119 from European Patent Application No. 13290014.3, filed Jan. 18, 2013, the entire disclosures of which are herein expressly incorporated by reference.

FIELD OF THE INVENTION

The invention relates to a method, a computer program and a computer-readable medium for displaying an attitude of an aircraft. Furthermore, the invention relates to a display system for displaying an attitude of an aircraft.

BACKGROUND OF THE INVENTION

There are a multitude of variants to provide pilots and operators with a visual indication of the attitude of an aircraft in space.

In particular, there are two major concepts, namely the moving-horizon/fixed-aircraft taking aircraft coordinates as a reference system and the moving-aircraft/fixed-horizon display referencing to earth coordinates. They are referred to as egocentric (inside-out) and exocentric (outside-in) indicator.

Both variants may be provided on head-down traditional instruments, on multifunction displays, on a head-up display and on head-mounted displays.

An egocentric attitude indicator uses the aircraft as the orientational viewpoint, such that the display reflects the way the visual environment might appear to the pilot inside the cockpit looking out as the horizon moves across the windscreen. When the aircraft banks (or rolls), for example, the display horizon tilts in the opposite direction against a fixed aircraft symbol. When placed along the longitudinal axis of the air-craft, this view is conformal with the real horizon.

For an exocentric attitude indicator, the viewpoint is that of an observer outside the aircraft who looks at a moving aircraft with respect to a fixed horizon. Therefore, when the aircraft banks, the horizon line remains stationary and the aircraft symbol tilts in accordance with the control input.

The standard attitude indicator in Russian aircraft is exocentric, as well as in some older Western aircraft. Usually, Russian aircraft display only bank in an exocentric manner while pitch is displayed outside-in. All exocentric displays feature an aircraft symbol which rotates in accordance with the bank angle (or roll angle). By contrast, most Western-built aircraft use egocentric attitude indicators.

Further interesting information for a pilot or an operator is the angle of attack based on the difference between the pitch of the aircraft and the flight path of the aircraft. Angle of attack indicators are typically standard round-dial instruments presenting either the angle of attack directly or as the ratio of the angle of attack versus a reference angle of attack.

SUMMARY OF THE INVENTION

It is an objective of the invention to provide a pilot or an operator of an aircraft with information on the attitude of an aircraft that is easy and fast to assimilate/interpret, unambiguous and adaptable to the current condition or flight state of the aircraft.

This objective is achieved by the subject-matter of the independent claims. Further exemplary embodiments are evident from the dependent claims and the following description.

An aspect of the invention relates to a method for displaying an attitude of an aircraft. In general, the method may be (automatically) executed by a controller of the aircraft or a ground station associated with the aircraft.

According to an embodiment of the invention, the method comprises receiving a roll angle, a pitch angle and a yaw angle of the aircraft, for example from a sensor system or by evaluation of sensor data; generating a display image indicating the roll angle, the pitch angle and the yaw angle, and displaying the display image on a display device. The display device may be a screen that is positioned in the field of view of the pilot or operator.

The display image, which may be a two-dimensional projection of a virtual (computer generated) scene, comprises a spherical shell (for example illustrated by a gradation net) with a track angle scale projected onto the spherical shell along a zero pitch line or artificial horizon of the spherical shell and with a pitch angle scale projected onto the spherical shell along a longitude line of the spherical shell (the longitude line positioned at the yaw angle of the aircraft with respect to the track angle scale). For example, the spherical shell may be a hemisphere and/or may have an upper part and a lower part, which may be differently colored and which may be separated by the artificial horizon.

The display image further comprises a graphical aircraft attitude indicator inside the spherical shell rotated with respect to the spherical shell such that the graphical aircraft attitude indicator indicates the roll angle, the pitch angle and the yaw angle of the aircraft with respect to the spherical shell. The graphical aircraft attitude indicator may be based on virtual graphical elements that are adapted to indicate an attitude of the aircraft such as a line pointing in the direction of a roll axis and/or a line pointing in the direction of a pitch axis inside the spherical shell. These axes may be defined by a rotated coordinate system with respect to a coordinate system defined by the spherical shell.

The pilot or the operator of the aircraft needs only to view the display image to gather a large amount of useful information with respect to the attitude of the aircraft. The spherical shell visualizes the environment of the aircraft and the graphical aircraft attitude indicator visualizes the orientation of the aircraft with respect to its environment. The pilot or operator need not refer to another device or gauge and the possibility of misinterpretation of the orientation of the aircraft is low.

The display image generally enables an intuitive interpretation of aircraft attitude, particularly in so-called "unusual attitude" situations, which may require immediate pilot or operator awareness and subsequent recovery maneuvers. The display image may be particularly useful for attitude indication at sustained high pitch attitudes.

According to an embodiment of the invention, the graphical aircraft attitude indicator comprises a graphical pitch angle indicator and a graphical roll angle indicator. For example, the graphical pitch angle indicator indicates a point on the spherical shell at the pitch angle, displaced by the respective yaw angle (if applicable). This point may be indicated with a circle on the spherical shell surrounding the point. The pitch angle indicator may comprise an arrow pointing to the point from the center of the spherical shell.

The pitch angle indicator may be based on a line starting at the center of the spherical shell, extending the aircraft longitudinal axis, and ending at the point on the spherical shell, which corresponds to the yaw angle and the pitch angle.

According to an embodiment of the invention, the graphical roll angle indicator indicates the roll angle with a line along a pitch axis defined by a coordinate system of the aircraft attitude indicator rotated by the roll angle, pitch angle and yaw angle. The line of the roll angle indicator may cross the center of the spherical shell. Since the line of the roll angle indicator is rotated with respect to the spherical shell (which has a defined orientation with respect to the display device), the display image may be seen as a type of perspective exocentric attitude indicator, as described above.

According to an embodiment of the invention, the graphical aircraft attitude indicator comprises a three-dimensional (virtual) aircraft model positioned at the center of the spherical shell and rotated with respect to the spherical shell such that the three-dimensional aircraft model has the roll angle, the pitch angle and the yaw angle of the aircraft with respect to the spherical shell. In such a way, the attitude of the (real) aircraft is indicated in a perspective way using the spherical shell and a three-dimensional model of the aircraft.

The graphical aircraft attitude indicator may comprise a schematic, symbolic or realistic three-dimensional model of an aircraft placed in the center of the spherical shell to visualize aircraft attitude. Compared to present exocentric attitude indications, this creates a perspective attitude indication, for which azimuth and elevation angle can be adapted either statically for a certain mission or flight phase, but may also be varied dynamically dependent on an aircraft's flight state.

An arrow and/or a line of the pitch angle indicator may run along the roll axis of rotated three-dimensional aircraft model. A line of the roll angle indicator may run along the pitch axis of the rotated three-dimensional aircraft model.

According to an embodiment of the invention, a flight path vector of the aircraft is received, which also may be determined from sensor data of the aircraft. The display image comprises a graphical flight path vector indicator pointing to a point on the spherical shell corresponding to the flight path vector. For example, the flight path vector indicator may comprise a circle surrounding this point. Since the difference between a flight path angle defined by the flight path vector and the pitch angle is the angle of attack of the aircraft, also the angle of attack may be visualized with the display image.

According to an embodiment of the invention, the method further comprises: choosing a virtual camera perspective for generating the display image; generating the display image (and in particular the spherical shell and the aircraft attitude indicator and/or the three-dimensional aircraft model) with respect to the chosen virtual camera perspective. The display image may be a two-dimensional projection of virtual three-dimensional objects such as a model of the spherical shell and the aircraft model. This two-dimensional projection may be generated with the aid of a virtual camera that defines the point of view for the projection. The camera perspective of the virtual camera that is used for rendering the display image may be variable. In particular, the camera perspective may be modified in realtime, i.e. during the flight of the aircraft.

According to an embodiment of the invention, the virtual camera perspective is chosen by an operator or pilot of the aircraft by entering a command into a control element. In other words, the perspective of the display image may be varied by commands of an operator.

According to an embodiment of the invention, the virtual camera perspective is chosen automatically dependent on the attitude or other flight state parameters of the aircraft. It is also possible that the perspective of the display image is moved based on decisions of a controller. For example, the virtual camera perspective may be moved to a position below the center of the spherical shell, when the pitch angle exceeds a predefined value.

According to an embodiment of the invention, the display image comprises a zenith and/or nadir indicator indicating the zenith and/or nadir of the spherical shell with respect to the pitch angle scale. For example, the zenith and/or nadir indicator comprises a symbol and/or circle placed at the zenith of the spherical shell.

According to an embodiment of the invention, the display image comprises at least one gauge with a scale bending around a part of a border of the spherical shell. Examples for such gauges are an airspeed gauge, an altitude and vertical speed gauge and a roll angle gauge.

According to an embodiment of the invention, the method further comprises: acquiring aircraft attitude data with a sensor system adapted for measuring the attitude of the aircraft; determining the roll angle, the pitch angle and the yaw angle from the aircraft attitude data and optionally the variation or evolution of these values over time. The sensor system may comprise sensors that are positioned in-side and/or outside of the aircraft. For example, some of these sensors may be telemetry equipment located at a ground station for controlling the aircraft.

A further aspect of the invention relates to a computer program for displaying an attitude of an aircraft, which, when being executed by a processor, is adapted to carry out the method as described in the above and in the following. For example, a control system of the aircraft or of a ground station associated with the aircraft may comprise such a processor.

A further aspect of the invention relates to a computer-readable medium, in which such a computer program is stored. A computer-readable medium may be a non-volatile medium such as a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a volatile medium such as a data communication network, e.g. the Internet, which allows downloading a program code.

A further aspect of the invention relates to a display system for displaying an attitude of an aircraft. The display system may comprise a controller for executing the method as described in the above and in the following and a display device for displaying the display image.

A further aspect of the invention relates to an aircraft comprising such a display system and a cockpit with the display device. For example, the aircraft may be an airplane or a helicopter, or a spacecraft. Applications of the display system may include stall detection in commercial aircraft, or monitoring of hover maneuvers in helicopters. The aircraft also may be a combat aircraft.

A further aspect of the invention relates to a ground station comprising such a display system, wherein the ground station is adapted for monitoring and/or controlling the aircraft. The aircraft may be an unmanned aerial vehicle, a rocket or cruise missile.

In general, the aircraft may be a rocket-propelled suborbital aircraft or orbital space-craft that is adapted to sustain high pitch attitudes, which may be monitored and/or controlled with the display system as herein described. The method and the system may enable trajectory monitoring in a more intuitive fashion due to the variable exocentric perspectives that may be adapted to the respective flight phases.

The display method and the display system may be used for unusual attitude recovery on any aircraft, suborbital space planes with sustained high pitch attitudes during rocket-propelled flight and ballistic phase, aircraft routinely performing stall, deep stall and post-stall maneuvers, combat and aerobatic aircraft capable of flying high angles of attack, combat aircraft equipped with thrust vectoring, and intuitive angle of attack indication for stall detection particularly in commercial aircraft.

It has to be understood that features of the method as described in the above and in the following may be features of the computer program, the computer-readable medium, and the display system and vice versa.

These and other aspects of the invention will be apparent from and elucidated with reference to the embodiments described hereinafter.

BRIEF DESCRIPTION OF THE DRAWINGS

Below, embodiments of the present invention are described in more detail with reference to the attached drawings.

In principle, identical parts are provided with the same reference symbols in the figures.

DETAILED DESCRIPTION OF EMBODIMENTS

Figure 1:
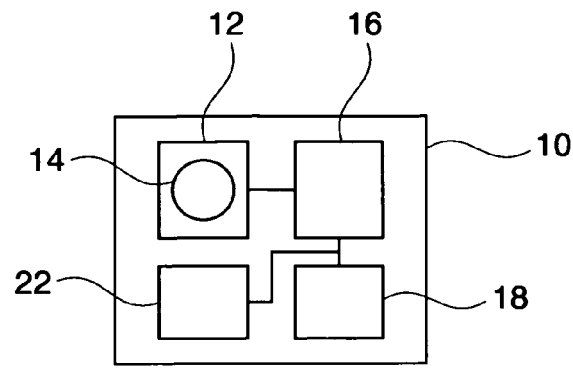
FIG. 1 schematically shows a display system according to an embodiment of the invention.

FIG. 1 schematically shows a display system 10 comprising a display device 12 for displaying a display image 14, a controller 16 for generating the display image 14, a sensor system 18 for acquiring attitude data of an aircraft 20 (see FIGS. 6 and 7) and a control element 22 for receiving inputs from an operator or pilot of the aircraft.

The display device 12 may comprise a screen that is adapted for displaying a computer-generated image like the display image 14. The controller 16 may comprise a computer and may be adapted for executing a computer program that generates or renders the display image 14 based on sensor data from the sensor system 18 and the inputs or commands from the control element 22, which may be a keyboard or may comprise buttons or control knobs. In particular, the controller 16 receives or determines the roll angle, pitch angle and yaw angle of the aircraft 20 and generates the display image 14 based on these flight attitude parameters.

It has to be noted that the components 12, 16, 18, 22 of the display system 10 need not be in one housing and may be located remote from each other. However, all of the components 12, 16, 18, 22 may be part of an aircraft 20.

Figure 2:
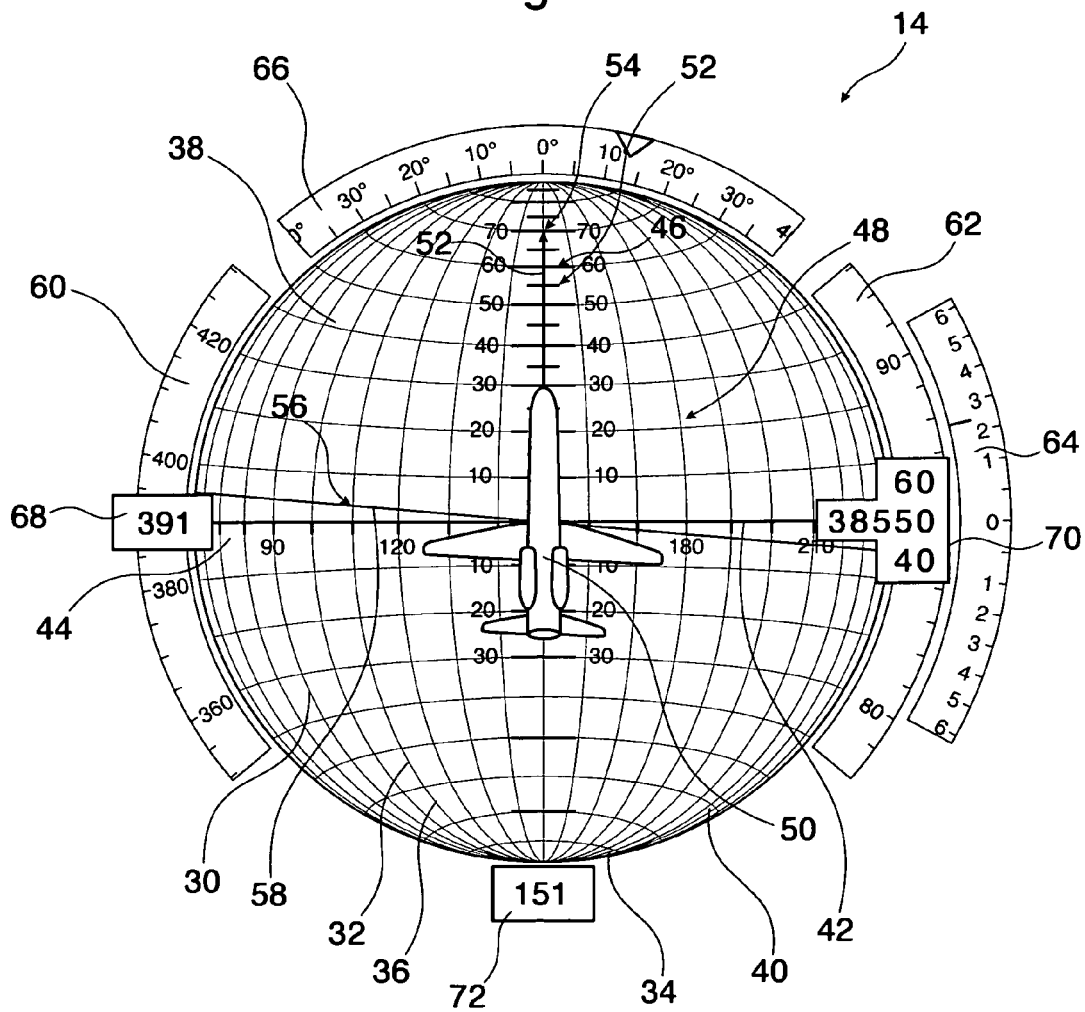
FIG. 2 shows a display image of a display system according to an embodiment of the invention.

FIG. 2 shows a display image 14 that may be displayed on the display device 12.

The display image 14 comprises a spherical shell 30 in the form of a hemisphere that is visualized with a gradation net 32, which may be adapted to the pilot task at hand. The gradation net 32 has latitude lines 34 and longitude lines 36. The spherical shell 30 has an upper part 38 and a lower part 40 that are separated at a horizon line 42 (which is the latitude line with 0° pitch). The upper part 38 and the lower part may be colored differently. For example, the spherical shell 30 may be colored in blue over brown like any conventional artificial horizon.

The spherical shell 30 comprises a heading/track angle scale 44 projected onto the spherical shell 30 along the horizon line 42 and a pitch angle scale 46 projected onto the spherical shell 30 along the longitude line 36 of the spherical shell 30 corresponding to the heading/track angle of the aircraft 20. The pitch angle scale 46 may comprise a pitch ladder overlaying the spherical shell 30.

The display image 14 comprises further a graphical aircraft attitude indicator 48 inside the spherical shell 30 that is rotated with respect to the spherical shell 30 by the roll angle, the pitch angle and the yaw angle of the aircraft 20.

The graphical aircraft attitude indicator 48 comprises a schematic/symbolic or realistic three-dimensional model 50 of the aircraft 20, which is placed in the center of the spherical shell 30 and rotated by the roll angle, the pitch angle and the yaw angle to visualize the aircraft attitude.

The graphical aircraft attitude indicator 48 comprises a graphical pitch angle indicator 50, which comprises an arrow ray and/or line 52 extending from the nose of the 3D aircraft model 50 along the roll axis of the aircraft model 50 and serves as a pitch reference. The tip of the arrow ray 52 points to a point 54 on the spherical shell 30 corresponding to the heading angle and the pitch angle.

Additionally, the graphical aircraft attitude indicator 48 comprises a graphical roll angle or bank angle indicator 56. The roll angle indicator 56 comprises a line or ray 58 extending from the center of gravity of the aircraft model 50 along the pitch axis of the aircraft model 50. The gradation net 32 inside the spherical shell 30 may serve as roll angle reference.

The graphical aircraft attitude indicator 48 with the aircraft model 50 and the spherical shell 30 are surrounded by tape scales or gauges for airspeed 60 (on the left), altitude 62 (on the right), vertical speed 64 (on the right) and roll angle 66 (on the top). The airspeed gauge 60 and the altitude gauge 62 are overlaid by numerical read-out windows 68, 70 showing the actual numerical value of the airspeed and the altitude, respectively. A numerical read-out window 72 showing the numerical value of the heading/track angle is positioned at the bottom of the spherical shell 30.

Figure 3:
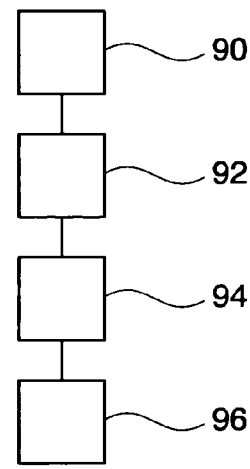
FIG. 3 shows a flow diagram for a method for displaying an attitude of an aircraft according to an embodiment of the invention.

FIG. 3 shows a flow diagram for a method for displaying the display image 14 that may be performed by the display system 10.

In step 90, the sensor system 18 acquires sensor data relating to the attitude, position and velocity of the aircraft 20, which for example may be generated by an attitude sensor inside the aircraft 20, a GPS sensor, an airspeed sensor as well as a position sensor (like a laser sensor or radar sensor) that may be located outside the aircraft 20.

In step 92, the controller 16 determines the roll angle, the pitch angle and the yaw angle from the aircraft attitude data.

Additionally, further parameters like a flight path vector, track, the ground speed, the aircraft speed and the altitude of the aircraft 20 may be determined in this step.

In step 94, the pilot/operator of the aircraft 20 and/or the controller 16 itself may choose or change a virtual camera perspective for generating the display image. In this step, the spherical shell 30 may be moved around its center such that specific features of the display image 14 may be seen in a better way. For example, the pilot/operator of the aircraft 20 may input commands into the control element 22 for changing the perspective. Also the controller 16 may change the perspective, when specific conditions are reached, for example, when the pitch angle is above or below a specific threshold value.

The perspective taken for the display image 14 in FIG. 2 is directly from behind the aircraft model 50, which may create a specific degree of resemblance with a standard exocentric attitude indication.

Figure 4:
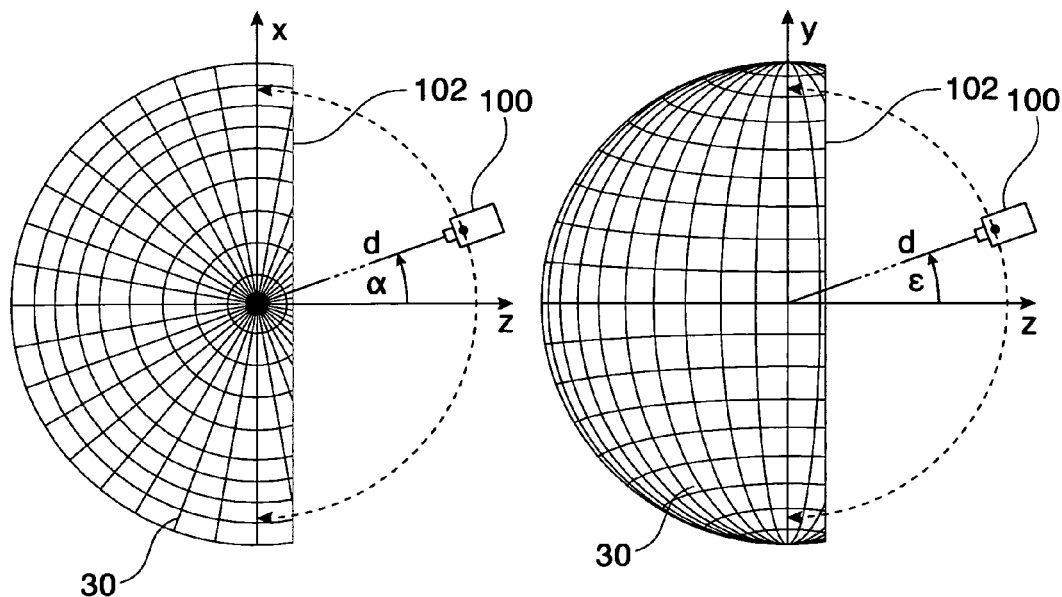
FIG. 4 schematically shows the positioning of a virtual camera for a display system according to an embodiment of the invention.

FIG. 4 shows the virtual camera 100 used for rendering the display image 14, which may be positioned freely at specific azimuth ($\alpha$) and elevation ($\epsilon$) angles, which, for example, may be adjusted within an interval from $-90°$ to $+90°$.

The distance d of the virtual camera 100 from the center of the spherical shell 30 and further camera parameters may be adjusted to obtain different focal lengths and to vary the field of view. Whenever the virtual camera 100 is rotated, the intersecting plane 102 defining the spherical shell 30 may be rotated by the same azimuth and elevation angle to ensure that the shell area visible remains constant. This is not shown in FIG. 4.

Returning to FIG. 3, in step 96, the display image 14 is generated with respect to the actual virtual camera perspective by the controller 16 and displayed on the display device 12.

Figure 5:
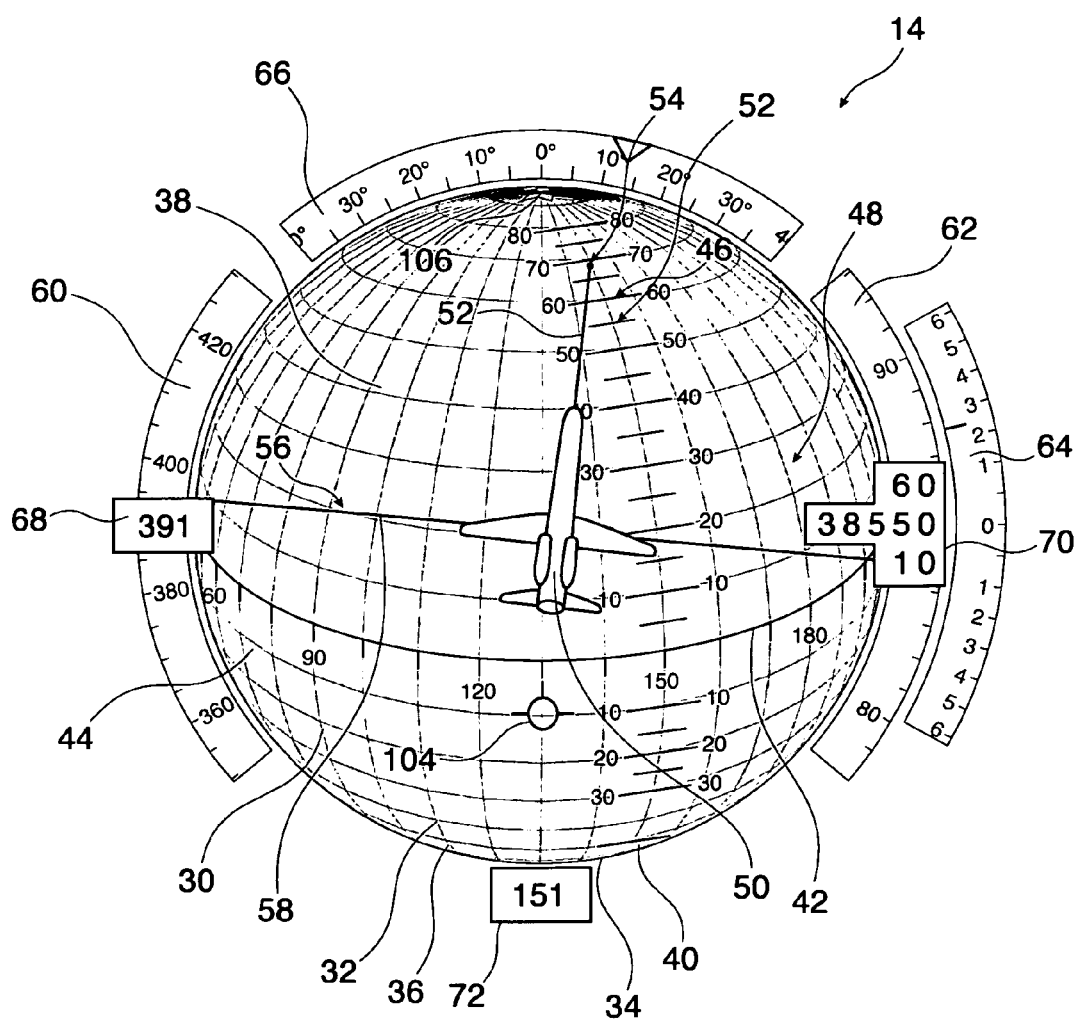
FIG. 5 shows another display image of a display system according to an embodiment of the invention.

FIG. 5 shows a display image 14 with a camera perspective different from FIG. 2 that has been generated with a camera elevation angle of $\epsilon=-20°$ and an azimuth angle $\alpha=25°$. Compared to FIG. 2, the viewport has shifted downwards and to the right. This enables an unobscured view of the pitch scale 46 and a graphical flight path vector indicator 104, shown here as a "birdy" type symbol on the spherical shell 30. The angle of attack of the aircraft 20, defined as the difference between flight path angle and pitch angle, will thus become immediately observable.

Furthermore, the downward translation of the camera position permits a better monitoring of high pitch attitudes as encountered e.g. by suborbital aircraft during a nearly vertical rocket-propelled or subsequent ballistic ascent.

A zenith indicator 106 (here a star shaped symbol) may be used along with tolerance rings to control or monitor flight path in this phase.

Azimuth and elevation angle creating the perspective may be adapted either statically for a certain mission or flight phase, but may also be varied dynamically dependent on a flight state of the aircraft. In the case of a suborbital aircraft, it can be envisaged that the downward shift of perspective as shown in FIG. 5 may be coupled to, for example, acceleration or vertical speed (or respective regimes). Aeronautical flight phases may then be conducted with a viewing perspective as shown in FIG. 2, while ascent to space and descent from space may be performed with a viewing perspective shifted upwards or downwards in the respective flight phases as shown in FIG. 5, thus enabling a more detailed monitoring of the pitch and flight path vector regime of interest.

Figure 6:
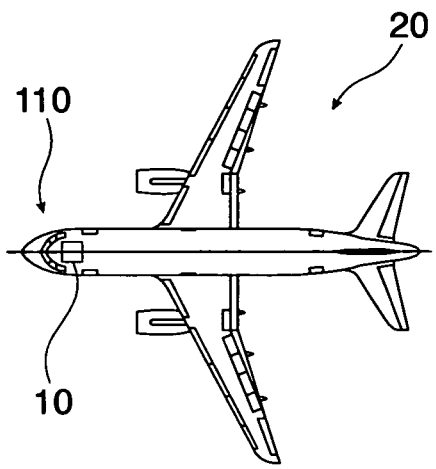
FIG. 6 schematically shows a manned aircraft according to an embodiment of the invention.

FIG. 6 shows an aircraft 20 in the form of an airplane which completely accommodates the display system 10 as shown in FIG. 1. The display device 12 may be situated in the cockpit 110 of the aircraft 20.

Figure 7:
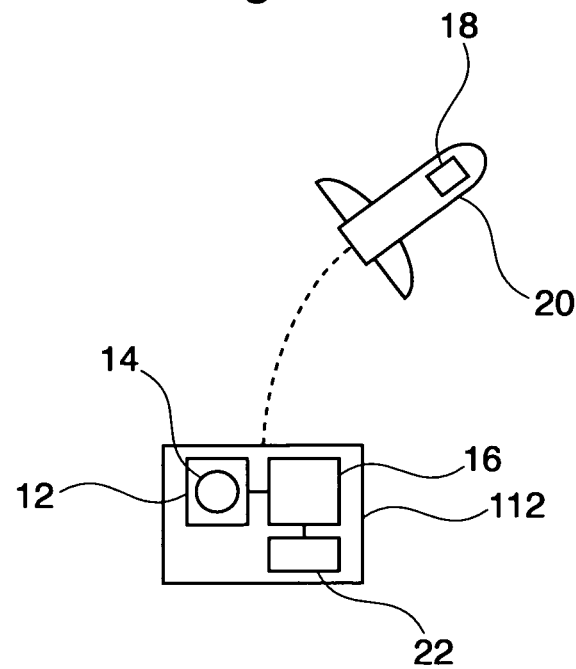
FIG. 7 schematically shows an unmanned aircraft with a ground station according to an embodiment of the invention.

FIG. 7 shows a system comprising an unmanned aircraft 20 in the form of a rocket that is controlled by a ground station 112, which may accommodate the display device 12, the controller 16 and the control element 22. The sensor system 18 may be part of the aircraft 20 which is connected to the ground station 112 via a wireless data communication.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method of operating an attitude indicator unit of an aircraft so as to display an attitude of the aircraft, the method comprising the steps of:
   receiving at a processor a roll angle, a pitch angle and a yaw angle of the aircraft;
   generating via the processor a display image indicating the roll angle, the pitch angle and the yaw angle;
   displaying the display image on a display device, wherein the display image is a virtual object that comprises:
      a spherical shell with a track angle scale projected onto the spherical shell along a latitude line of the spherical shell and with a pitch angle scale projected onto the spherical shell along a longitude line of the spherical shell, the track angle scale and the pitch angle scale defining coordinates on the spherical shell, and
      a graphical aircraft attitude indicator inside the spherical shell and rotated with respect to the spherical shell according to a viewing perspective such that the graphical aircraft attitude indicator indicates the roll angle, the pitch angle and the yaw angle of the aircraft with respect to the spherical shell, wherein the graphical aircraft attitude indicator comprises a graphical pitch angle indicator that identifies a coordinate on the spherical shell, the coordinate corresponding to the pitch angle and the track angle according to the pitch angle scale and the track angle scale; and
   rotating via the processor the spherical shell so as to adjust the viewing perspective while maintaining the identification of the coordinate on the spherical shell by the graphical pitch angle indicator.

2. The method of claim 1, wherein the graphical aircraft attitude indicator further comprises a graphical roll angle indicator that indicates the roll angle with a line along a pitch axis defined by a coordinate system of the aircraft attitude indicator rotated by the roll angle, pitch angle and yaw angle.

3. The method of claim 1, wherein the graphical aircraft attitude indicator comprises a three-dimensional aircraft model positioned at the center of the spherical shell and rotated with respect to the spherical shell such that the three-dimensional aircraft model has the roll angle, the pitch angle and the yaw angle of the aircraft with respect to the spherical shell.

4. The method of claim 1,
wherein a flight path vector of the aircraft is received, and
wherein the display image comprises a graphical flight path vector indicator pointing to a point on the spherical shell corresponding to the flight path vector.

5. The method of 1, further comprising the acts of:
choosing a virtual camera perspective for generating the display image; and
generating the display image with respect to the chosen virtual camera perspective.

6. The method of claim 5, wherein the virtual camera perspective is chosen by an operator of the aircraft by entering a command into a control element.

7. The method of claim 5, wherein the virtual camera perspective is chosen automatically dependent on the flight state of the aircraft.

8. The method of claim 1, wherein the display image comprises at least one gauge with a scale bending around a part of a border of the spherical shell.

9. The method of claim 1, further comprising the acts of:
acquiring aircraft attitude data with a sensor system adapted for measuring the attitude of the aircraft;
determining the roll angle, the pitch angle and the yaw angle from the aircraft attitude data.

10. A non-transitory computer-readable medium comprising processor readable instructions, which when executed via at least one processor causes the at least one processor to carry out a method of operating an attitude indicator unit of an aircraft so as to display an attitude of the aircraft, the method comprising the steps of:
receiving at the processor a roll angle, a pitch angle and a yaw angle of the aircraft;
generating via the processor a display image indicating the roll angle, the pitch angle and the yaw angle;
displaying the display image on a display device, wherein the display image is a virtual object that includes:
a spherical shell with a track angle scale projected onto the spherical shell along a latitude line of the spherical shell and with a pitch angle scale projected onto the spherical shell along a longitude line of the spherical shell, the track angle scale and the pitch angle scale defining coordinates on the spherical shell, and
a graphical aircraft attitude indicator inside the spherical shell and rotated with respect to the spherical shell according to a viewing perspective such that the graphical aircraft attitude indicator indicates the roll angle, the pitch angle and the yaw angle of the aircraft with respect to the spherical shell, wherein the graphical aircraft attitude indicator comprises a graphical pitch angle indicator that identifies a coordinate on the spherical shell, the coordinate corresponding to the pitch angle and the track angle according to the pitch angle scale and the track angle scale; and
rotating via the processor the spherical shell so as to adjust the viewing perspective while maintaining the identification of the coordinate on the spherical shell by the graphical pitch indicator.

11. An attitude indicator unit configured to display an attitude of an aircraft, the attitude indicator unit comprising a controller and a display device, wherein the controller is configured to:
receive a roll angle, a pitch angle and a yaw angle of the aircraft;
generate a display image indicating the roll angle, the pitch angle and the yaw angle; and
cause the display device to display the display image, wherein the display image is a virtual object that comprises:
a spherical shell with a track angle scale projected onto the spherical shell along a latitude line of the spherical shell and with a pitch angle scale projected onto the spherical shell along a longitude line of the spherical shell, the track angle scale and the pitch angle scale defining coordinates on the spherical shell, and
a graphical aircraft attitude indicator inside the spherical shell and rotated with respect to the spherical shell according to a viewing perspective such that the graphical aircraft attitude indicator indicates the roll angle, the pitch angle and the yaw angle of the aircraft with respect to the spherical shell, wherein the graphical aircraft attitude indicator comprises a graphical pitch angle indicator that identifies a coordinate on the spherical shell, the coordinate corresponding to the pitch angle and the track angle according to the pitch angle scale and the track angle scale; and
rotate the displayed spherical shell so as to adjust the viewing perspective while maintaining the displayed identification of the coordinate on the spherical shell by the graphical pitch indicator.

* * * * *